United States Patent
Patel

(10) Patent No.: US 9,661,949 B1
(45) Date of Patent: May 30, 2017

(54) SEGMENTED FRENCH PRESS

(71) Applicant: Sargam Patel, West Hollywood, CA (US)

(72) Inventor: Sargam Patel, West Hollywood, CA (US)

( * ) Notice: Subject to any disclaimer, the term of this patent is extended or adjusted under 35 U.S.C. 154(b) by 0 days.

(21) Appl. No.: 15/162,256

(22) Filed: May 23, 2016

(51) Int. Cl.
A47J 31/38 (2006.01)
A47J 31/20 (2006.01)
A47J 31/36 (2006.01)
A47J 31/24 (2006.01)

(52) U.S. Cl.
CPC ............ A47J 31/20 (2013.01); A47J 31/24 (2013.01); A47J 31/36 (2013.01)

(58) Field of Classification Search
CPC .. A47J 31/37; A47J 31/24; A47J 31/20; A47J 31/36
USPC ........................................ 99/287, 297, 302 P
See application file for complete search history.

(56) References Cited

U.S. PATENT DOCUMENTS

| 7,194,951 B1* | 3/2007 | Porter | A47J 31/005 100/116 |
| D571,610 S * | 6/2008 | Bodum | D7/397 |
| 2014/0060337 A1* | 3/2014 | Varnum | A47J 31/38 99/297 |
| 2015/0059592 A1* | 3/2015 | Richardson | A47J 31/20 99/297 |

* cited by examiner

Primary Examiner — Reginald L Alexander
(74) Attorney, Agent, or Firm — Arent Fox LLP

(57) ABSTRACT

The present system provides a French Press that comprises a carafe with a removable bottom member. The bottom member is threaded onto the man body of the carafe and forms a watertight seal during use of the carafe. During the preparation of the coffee using the French Press, normal operation is possible. The spent grounds collect naturally in the bottom member during use, and are in fact urged there by depression of the plunger during operation. After use, the bottom member can be easily removed from the main body of the carafe and the spent grounds can be easily cleaned from the bottom member, along with any stray grounds that might have remained in the main body of the carafe.

9 Claims, 2 Drawing Sheets

SEGMENTED FRENCH PRESS

BACKGROUND OF THE SYSTEM

There are a number of methods and apparatuses for the preparation of coffee and tea drinks. One method is the use of a so called "French Press". The French Press, also referred to as a press pot, plunger, coffee press, cafetiere, and the like, is comprise of a carafe for holding liquid, with a lid and a plunger. Coffee beans, grounds, or tea is placed into the carafe, which is then filled with hot water. The lid contains the plunger, which includes a wire mesh, circular spring, or other filter like mechanism. With the lid on the plunger, it is pressed toward the bottom of the carafe to separate the coffee, grounds, or tea from the infused liquid which is intended for consumption. While pouring the liquid, the plunger stays in place to prevent the grounds/tea from entering the top.

After preparation, the lid and plunger are removed, and the carafe is then cleaned of the used coffee grounds in anticipation of the next use. However, the cleaning of the used grounds is difficult. The grounds are scooped out by hand or with a device such as a spoon, and the carafe then wiped with sponge, cloth or placed into the dishwasher to remove all of the grounds and oil residue of the liquid. This is an extremely messy process where ground are often stuck in the press and may involve quite a bit of effort to fully clean the carafe for the next use.

SUMMARY

The present system provides a French Press that comprises a carafe with a removable bottom member. The bottom member is threaded onto the man body of the carafe and forms a watertight seal during use of the carafe. During the preparation of the coffee using the French Press, normal operation is possible. The spent grounds collect naturally in the bottom member during use, and are in fact urged there by depression of the plunger during operation. After use, the bottom member can be easily removed from the main body of the carafe and the spent grounds can be easily cleaned from the bottom member, along with any stray grounds that might have remained in the main body of the carafe. Not only is the bottom member easier to clean because of its shallow depth, but the carafe itself is easier to clean because it can be flushed through quite easily instead of rinsed and tipped as with prior art systems.

DETAILED DESCRIPTION OF THE SYSTEM

Figure 1A:
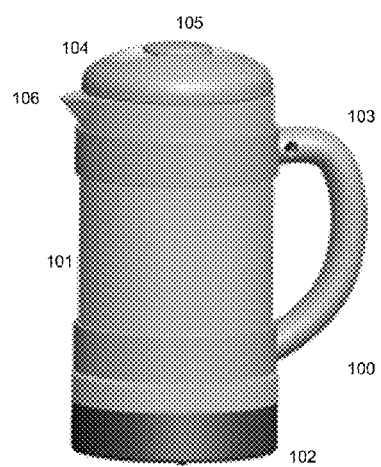
FIG. 1A illustrates an assembled embodiment of the French Press.
Figure 1B:
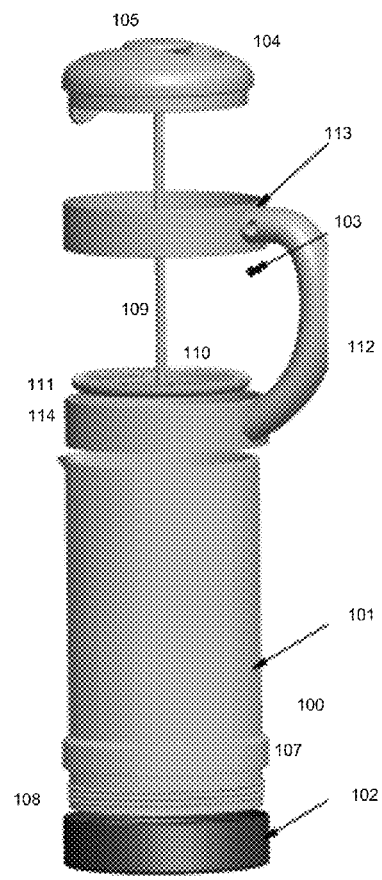
FIG. 1B illustrates an exploded view of the French Press of FIG. 1A.

FIGS. 1A and 1B illustrate an assembled view and an exploded view of an embodiment of the device. The device 100 includes a main body 101, bottom member 102, handle assembly 103, lid 104 and plunger 105. The main body 101 is a substantially cylindrical hollow and open on top and bottom. The main body may include a pour spout 106 to aid in pouring the liquid from the main body 101. In one embodiment the main body 101 is comprised of glass. However, the main body may be comprised of any suitable material for providing, with the bottom member, a receiver for fluids such as coffee.

The device 100 includes a bottom member 102 that may be removably attached to the main body 101. The bottom member 102 in one embodiment is removably attached by matching threads on the interior of the bottom member 102 (not shown in FIG. 1B) and threads 108 on the exterior of the bottom portion of main body 101 (see FIG. 1B). Although shown as removably coupled via threads for a screw on operation, the bottom member may also be removably coupled via other means, such as a compression fit, keyed or registered clips or lips for locking the bottom member in place, or any other suitable coupling means.

During operation, the bottom member should provide a substantially fluid-tight seal so that coffee is not expressed through the boundary between the bottom member and the main body. The bottom member may be comprised of plastic, metal, or glass as desired.

The device 100 includes a lid 104 through which is inserted a plunger assembly 105. Typically the plunger and lid assembly are coupled together and work as a unit. During operation the lid is pressed down, thereby pushing the plunger plate 110 down toward the bottom of the main body 101. The lid 104 engages the top opening of main body 101 to both retain the liquid in the device during operation to retain heat after brewing, and to support the plunger in place to keep spent grounds below the plunger plate 110. The lid 104 may be metal or plastic as desired.

The plunger assembly 105 comprises a shaft 109 coupled to a plunger plate 110. The plunger plate 110 typically has openings formed in the face thereof and covered by a wire mesh or screen. The screen acts as a filter to allow fluid to pass there-through while preventing the grounds from passing through. Often a spring, such as spring 111 is disposed circumferentially around the outer edge of the plunger plate 110 to urge the plate 110 to a correct position and provide appropriate force between the plunger plate and sidewall of the main body to prevent ground from entering the liquid chamber via the gap between the plunger body and side wall. The main body 101 is positioned such that the plunger shaft 109 is coaxial with the cylinder of the main body 101.

The plunger assembly is typically metal but may be a combination of metal or plastic or any materials that provide a method of filtering the fluid from the grounds during operation.

A handle assembly 103 is used to lift the device for pouring the brewed coffee into a cup or other container. The handle assembly 103 may comprise a handle 112 coupled to an upper band 113 and lower band 114. The bands 113, 114 may encircle the main body 101, with a ridge or abutment 107 formed on the main body 101 to seat the handle assembly and prevent movement of the handle assembly during use. Alternatively, the handle 112 can be affixed directly to the main body 101 or may be formed as part of the main body 101 as desired.

As shown in FIGS. 1A and 1B, the bottom member is configured such that it's threads are on the inside surface so that it mates with the outside threads of the main body 101. However, the device may be configured so that the threads on the bottom member are on the outside surface and the threads on the main body 101 are on the inside surface without departing from the scope and spirit of the device.

Figure 2A:
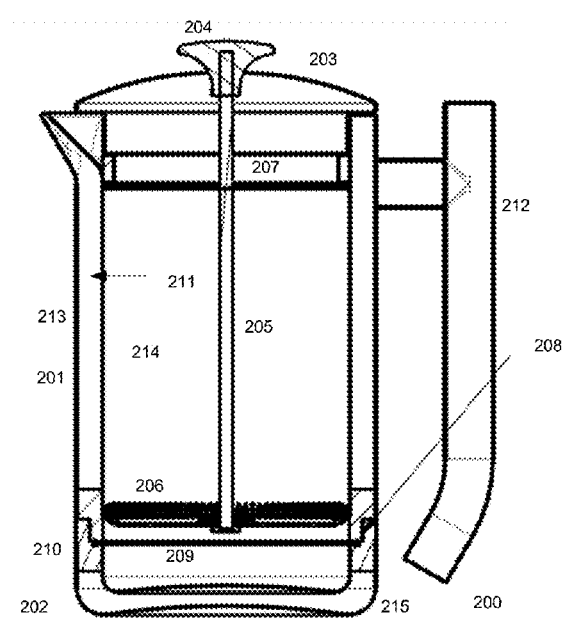
FIG. 2A illustrates a cutaway view of a French Press with a double wall carafe.
Figure 2B:
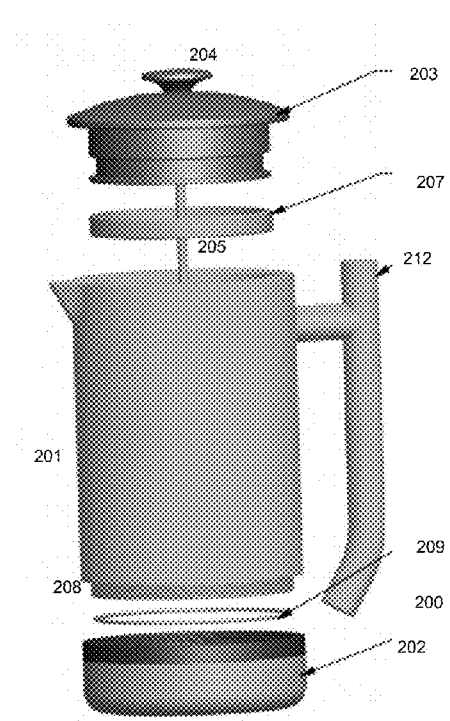
FIG. 2B illustrates an exploded view of the French Press of FIG. 2A.

FIGS. 2A and 2B illustrate another embodiment of the device that shows an insulated carafe, a different bottom member, different handle configuration and the like. It should be understood that the device may be configured with any, some, or all of these features without departing from the scope and spirit of the device.

The device 200 implements an insulated carafe comprising a main body 201 having an outer wall 213 and inner wall 214 with an evacuated space 211 there-between to provide temperature insulation. Similarly, the bottom member 202 is double walled and includes an evacuated space 215 to provide insulation. In one embodiment, the bottom member 202 may be single walled but made of a thermal insulating material to provide temperature insulation for the liquid contained in the device during use.

The device 200 includes a lid 203 and plunger assembly 204 with shaft 205 and plunger plate 206. As described above, the plunger plate 206 includes openings therein to allow fluid flow while inhibiting the passage of coffee grounds. A wire spring encircling the plunger plate 206 provides stability during use.

A handle 212 may be formed integrally with the main body 201. Alternatively, a handle assembly as illustrated in FIGS. 1A and 1B may be used with the embodiment of FIGS. 2A and 2B.

The bottom member 202 of this embodiment is coupled to the main body 201 during use by a registered pressure fit using a gasket to aid in making the seal fluid-tight. The main body 201 has a stepped shoulder 208 that engages an opposite stepped shoulder 210 on bottom member 202. A gasket 209, which may be rubber, plastic, or some other flexible material, is placed on the upfacing step of the shoulder 210 of the bottom member 202. The down projecting portion of the shoulder 208 of main body 201 engages and compresses the gasket during use, providing a suitable fluid seal between the members during use.

In one embodiment the exposed portion of the shoulder 208 is threaded, and the upper portion of the shoulder 210 of the bottom member 202 is also threaded for a screw on attachment mechanism, with or without the gasket 209.

In the embodiment of FIGS. 2A and 2B, a ring member 207. The optional ring member can provide further stabilization of the plunger shaft to ensure the plunger plate remains essentially perpendicular to the sidewall 214.

In operation, the plunger assembly is such that the plunger plate descends to the approximate point of intersection between the bottom member 202 and the main body 201. After use, the spent grounds are thus captured in the bottom member 202 so that when it is decoupled from the main body, all of the spent grounds are found in the bottom member and can be disposed of quite easily. Any spent grounds that may have seeped through the filter mechanism on the plunger plate can be easily rinsed away from the interior of the main body 201.

Thus, an improved French press coffee maker has been described.

What is claimed is:
1. A French press device comprising:
  a main body comprising having a top opening and a bottom opening;
  a bottom member removably attached to the main body at the bottom opening, wherein the bottom member and main body together form a contiguous inner wall wherein a first portion of the contiguous inner wall is formed by an inner wall of the bottom member and a second portion of the contiguous inner wall is formed by an inner wall of the main body meeting the inner wall of the bottom member at an interface;
  a plunger assembly disposed within the main body and moveably disposed between the top opening and coincident with the bottom opening;
    wherein the bottom member is removably coupled to the main body via a threaded connection such that the bottom member is disposed below the plunger assembly when the plunger assembly is disposed coincident with the bottom opening.
2. The device of claim 1 further including a gasket between the bottom member and the main body.
3. The device of claim 1 wherein the bottom member is removably coupled to the main body via a compression fit.
4. The device of claim 1 further including a gasket between the bottom member and the main body.
5. The device of claim 1 wherein the main body is comprised of glass.
6. The device of claim 1 wherein the main body is double walled to provide thermal insulation.
7. The device of claim 1 wherein the bottom member is comprised of plastic.
8. The device of claim 1 wherein the bottom member is double walled to provide thermal insulation.
9. The device of claim 1 wherein the main body is comprised of plastic.

* * * * *

(12) EX PARTE REEXAMINATION CERTIFICATE (11590th)
United States Patent
Patel

(10) Number: US 9,661,949 C1
(45) Certificate Issued: Oct. 28, 2019

(54) SEGMENTED FRENCH PRESS

(71) Applicant: Sargam Patel, West Hollywood, CA (US)

(72) Inventor: Sargam Patel, West Hollywood, CA (US)

Reexamination Request:
No. 90/014,293, Apr. 22, 2019

Reexamination Certificate for:
Patent No.: 9,661,949
Issued: May 30, 2017
Appl. No.: 15/162,256
Filed: May 23, 2016

(51) Int. Cl.
*A47J 31/38* (2006.01)
*A47J 31/20* (2006.01)
*A47J 31/24* (2006.01)
*A47J 31/36* (2006.01)

(52) U.S. Cl.
CPC ............... *A47J 31/20* (2013.01); *A47J 31/24* (2013.01); *A47J 31/36* (2013.01)

(58) Field of Classification Search
None
See application file for complete search history.

(56) References Cited

To view the complete listing of prior art documents cited during the proceeding for Reexamination Control Number 90/014,293, please refer to the USPTO's public Patent Application Information Retrieval (PAIR) system under the Display References tab.

*Primary Examiner* — Russell D Stormer

(57) ABSTRACT

The present system provides a French Press that comprises a carafe with a removable bottom member. The bottom member is threaded onto the man body of the carafe and forms a watertight seal during use of the carafe. During the preparation of the coffee using the French Press, normal operation is possible. The spent grounds collect naturally in the bottom member during use, and are in fact urged there by depression of the plunger during operation. After use, the bottom member can be easily removed from the main body of the carafe and the spent grounds can be easily cleaned from the bottom member, along with any stray grounds that might have remained in the main body of the carafe.

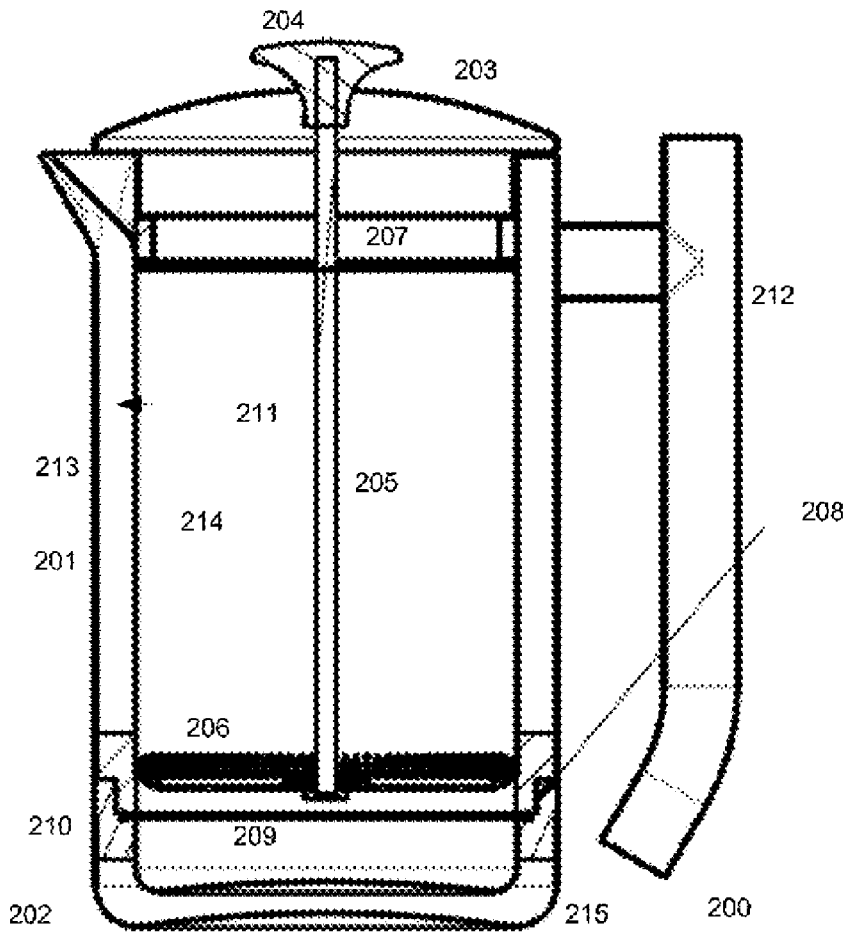

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-9 are cancelled.

* * * * *

EX PARTE REEXAMINATION CERTIFICATE (11889th)
United States Patent
Patel

(10) Number: US 9,661,949 C1
(45) Certificate Issued: Jul. 30, 2021

(54) SEGMENTED FRENCH PRESS

(71) Applicant: Sargam Patel, West Hollywood, CA (US)

(72) Inventor: Sargam Patel, West Hollywood, CA (US)

Reexamination Request:
No. 90/014,293, Apr. 22, 2019

Reexamination Certificate for:
Patent No.: 9,661,949
Issued: May 30, 2017
Appl. No.: 15/162,256
Filed: May 23, 2016

(51) Int. Cl.
- *A47J 31/38* (2006.01)
- *A47J 31/20* (2006.01)
- *A47J 31/24* (2006.01)
- *A47J 31/36* (2006.01)

(52) U.S. Cl.
CPC .............. *A47J 31/20* (2013.01); *A47J 31/24* (2013.01); *A47J 31/36* (2013.01)

(58) Field of Classification Search
None
See application file for complete search history.

(56) References Cited

To view the complete listing of prior art documents cited during the proceeding for Reexamination Control Number 90/014,293, please refer to the USPTO's public Patent Application Information Retrieval (PAIR) system under the Display References tab.

*Primary Examiner* — Russell D Stormer

(57) ABSTRACT

The present system provides a French Press that comprises a carafe with a removable bottom member. The bottom member is threaded onto the man body of the carafe and forms a watertight seal during use of the carafe. During the preparation of the coffee using the French Press, normal operation is possible. The spent grounds collect naturally in the bottom member during use, and are in fact urged there by depression of the plunger during operation. After use, the bottom member can be easily removed from the main body of the carafe and the spent grounds can be easily cleaned from the bottom member, along with any stray grounds that might have remained in the main body of the carafe.

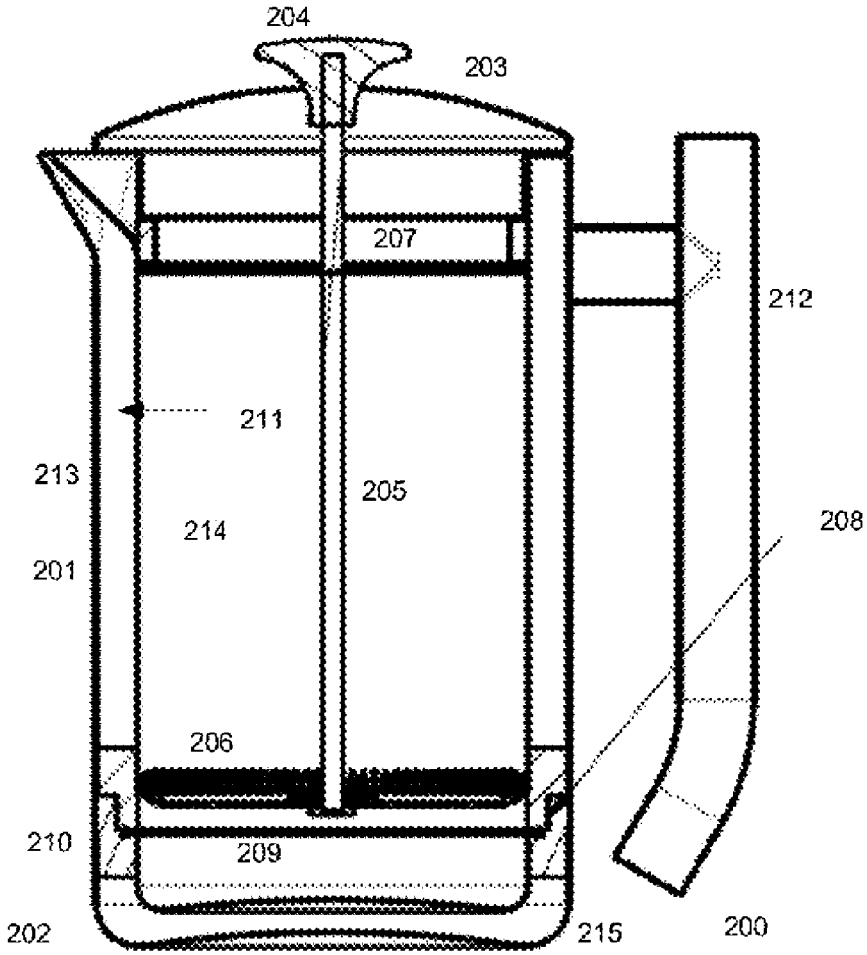

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-9 are cancelled.

\* \* \* \* \*